May 28, 1968  J. H. McGINN  3,385,111
MEASURING APPARATUS
Filed Nov. 15, 1965  3 Sheets-Sheet 1
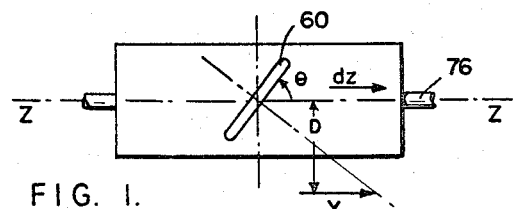
FIG. 1.
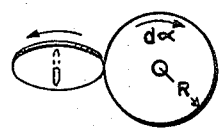
FIG. 2.
FIG. 3.
(1) $\quad R \cdot d\alpha = dz \cdot \tan\theta$
(2) $\quad Y = D \cdot \tan\theta$
(3) $\quad d\alpha = \dfrac{1}{RD} \cdot Y \cdot dz$
(4) $\quad \alpha = \dfrac{1}{RD}\displaystyle\int_{Z_1}^{Z_2} Y \cdot dz$
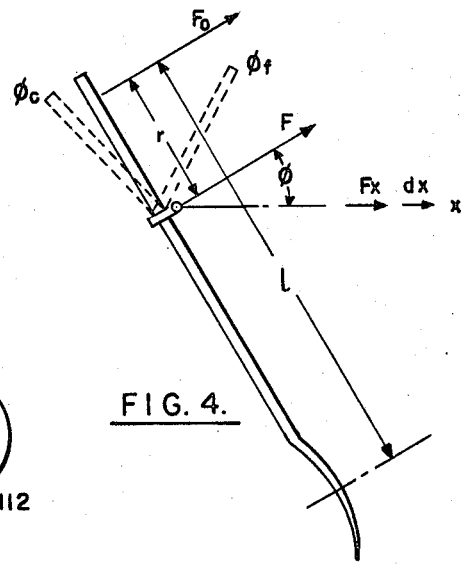
FIG. 4.
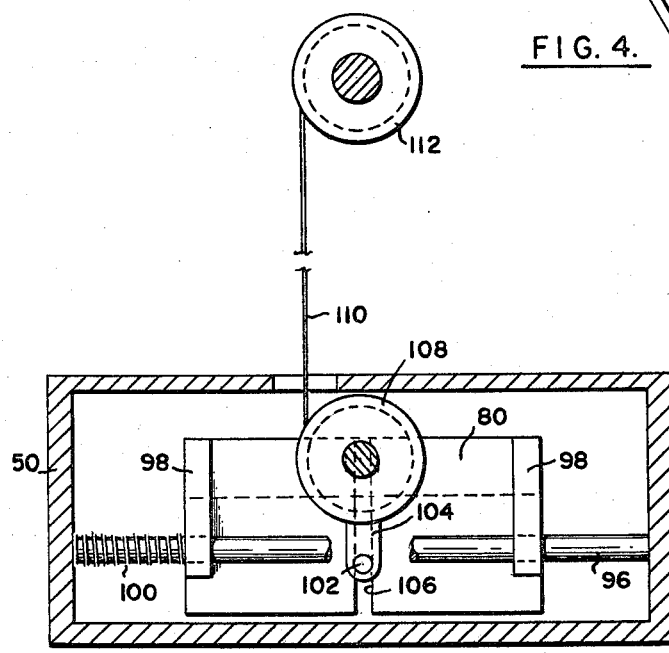
FIG. 9.
INVENTOR
JOHN H. McGINN
BY
Busser Smith & Harding
ATTORNEYS May 28, 1968     J. H. McGINN     3,385,111

MEASURING APPARATUS

Filed Nov. 15, 1965     3 Sheets-Sheet 2

INVENTOR
JOHN H. McGINN
BY
*Busser Smith & Harding*
ATTORNEYS

May 28, 1968  J. H. McGINN  3,385,111
MEASURING APPARATUS

Filed Nov. 15, 1965  3 Sheets-Sheet 3

INVENTOR
JOHN H. McGINN
BY
  *Busser Smith & Harding*
  ATTORNEYS

3,385,111
MEASURING APPARATUS
John H. McGinn, 321 Berkeley Road,
Merion Station, Pa. 19066
Filed Nov. 15, 1965, Ser. No. 507,941
10 Claims. (Cl. 73—380)

This invention relates to measuring apparatus, and more particularly concerns an integrator and a dynamometer which are especially adapted for use in measuring the force exerted and work done by an oarsman in propelling a shell.

In an eight oar shell, for example, it is difficult to judge the amount of propulsive power contributed to the shell by each member of the crew. Near the end of a race, some oarsmen exert very little power even though they think they are.

It is even more difficult for a coach to judge just how much each member of the crew is contributing to the overall effort so as to be able to pick the best men for the crew.

Accordingly, it is an object of this invention to provide measuring apparatus which measures the propulsive force exerted by an oarsman and indicates the magnitude of such force.

It is another object to measure the amount of work being done by an oarsman.

It is another object to provide measuring apparatus which presents a visual pattern, to a coxswain or a coach, of the amount of force being exerted on an oarlock by an oarsman, and also indicates the synchronization of that force with other oarsmen, the duration of the force, and the manner of its application to the oarlock whether it be applied quickly or gradually.

It is another object to provide a new and improved integrator, per se.

Other objects of the invention will become more apparent from the followingg description, read in conjunction with the accompanying drawings, in which:

FIG. 1 is a diagrammatic view showing a cylinder and wheel which form elements of the integrator of the invention;

FIG. 2 is an end view of the apparatus of FIG. 1 looking from the right of FIG. 1;

FIG. 3 shows a series of equations, 1 to 4, which are helpful in explaining the invention;

FIG. 4 is a diagrammatic view illustrating the forces and angles in relation to an oar in an oarlock;

FIG. 9 is a view in horizontal section taken as indicated by the lines and arrows 9—9 which appear in FIG. 7.

Turning now to the drawings, referring especially to FIGURE 4, the force, $F_x$, exerted by the oarsman in the $x$-direction, which is the direction of travel along the axis of the boat, at the handle of the oar, may be stated to be equal to $$\left(\frac{l-r}{l}\right)F \cos \phi$$

The displacemment $dx$ at the handle in the $x$-direction in terms of $d\phi$ is $r \cos \phi d\phi$.

Hence, the increment of effective work, $dw_e$ equals $$r\left(\frac{l-r}{l}\right)F \cos^2 \phi d\phi$$

and the work per stroke is:

$$w_e = r\left(\frac{l-r}{l}\right)\int_{\phi_0}^{\phi_t} F \cos^2 \phi d\phi$$

where $\phi_c$ is the catch angle, the angle between the oar when it is catching the water and a line which is normal to the $x$-axis of the boat, and $\phi_f$ is the angle between the line normal to the $x$-axis of the boat and the oar when it has finished its stroke and leaves the water.

Using A as a constant including the geometrical constants $l$ and $r$ and a fixed scale factor:

$$w_e = A\int_{\phi_0}^{\phi_t} F \cos^2 \phi d\phi$$

in which $\phi=0$ at the oar position perpendicular to the $x$-axis of the boat (with $\phi_c$ being negative and $\phi_f$ being positive in the stroke), and F is a function of $\phi$ varying during a stroke and also from stroke to stroke.

The total effective work is then $W = \Sigma w_e$ for the total strokes involved, e.g. through a complete race.

One of the objects of the invention is to indicate and/or record the summation of this work. In practice, negative work, dragging the oar, is negligible so negative force need not be considered by the apparatus of the invention.

In the apparatus, especially that shown in FIG. 1, $dz$ is a measure of $\cos \phi d\phi$ and Y is a measure of F $\cos \phi$. Therefore, the integral $$\int_{z_0}^{z_t} Y dz = K \int_{\phi_0}^{\phi_t} F \cos^2 \phi d\phi$$

for each stroke, or, summed for the strokes, is a linear measure of $W_e$.

Figure 5:
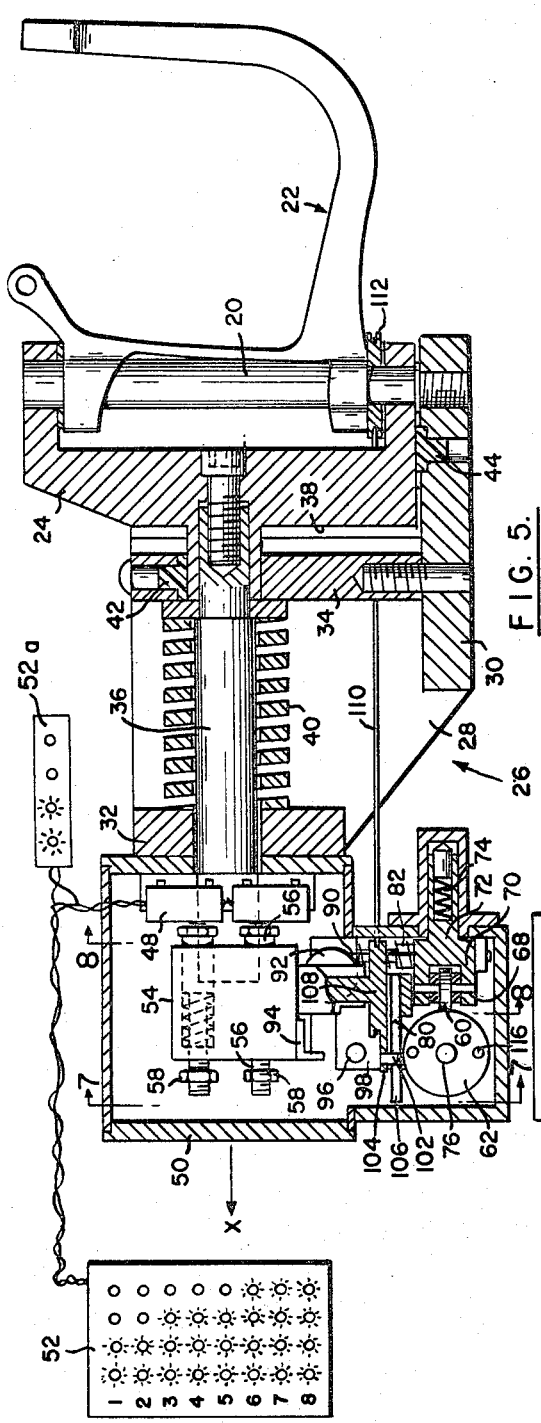
FIG. 5 is a view in section of an oarlock constructed in accordance with the invention and taken as indicated by the lines and arrows 5—5 which appear in FIG. 6.
Figure 6:
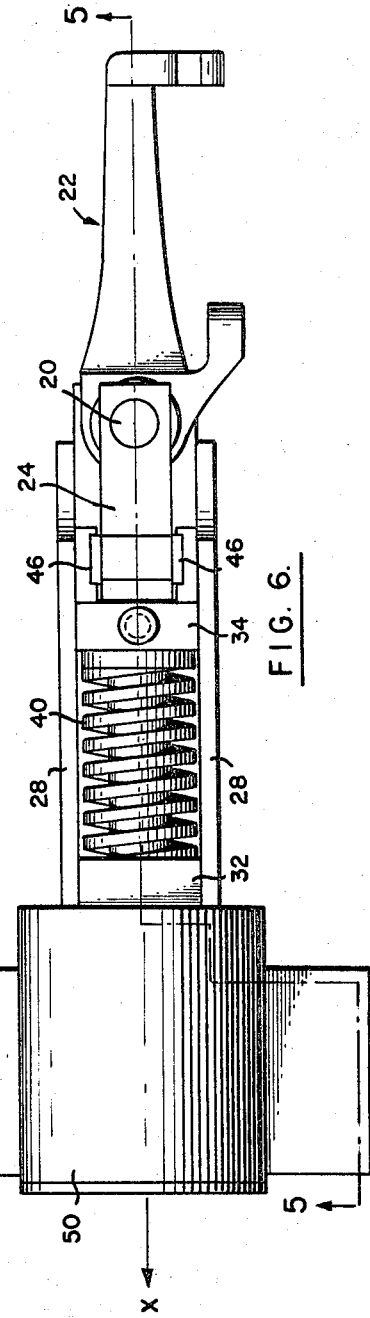
FIG. 6 is a view in the top plan of the measuring apparatus of FIG. 5.

Turning now particularly to FIG. 5, when pulling on an oar, a force is exerted on a pivot pin 20 of oarlock 22. As shown in FIG. 4, the propulsive force is the $x$-component of the force F and is designated $F_x$, which is equal to F $\cos \phi$ where $\phi$ is measured from the normal to the $x$-axis.

If $l$ be the distance from the oar handle to the center of resistance of the blade, and $r$ be the distance from the handle to the pivot pin 20, from a consideration of the moments, the force exerted by the oarsman in the $x$-direction is given by:

$$\frac{(l-r)}{l} F \cos \phi$$

The work per stroke, $w_e$, which the oarsman contributes to the motion of the boat is the integral of $$\frac{(l-r)}{l} F \cos \phi dx$$

taken from the catch of the stroke to the finish. In terms of $\phi$ the work done is:
$w_e$ is proportional to:

$$\int_{\phi_0}^{\phi_t} r\left(\frac{l-r}{l}\right) F \cos^2 \phi d\phi = A \int_{\phi_0}^{\phi_t} F \cos^2 \phi d\phi$$

The factor A includes all geometrical constants plus the constant for the system of units being used, e.g., English or Metric.

The cumulative work done for an arbitrary number of strokes, $n$, is $W_e = \Sigma_n w_e$. If the time required is $t_n$ the average power expended is $\bar{P} = W_e/t_n$.

The apparatus of this invention provides an indication of the instantaneous level of force being exerted by an oarsman. It also simultaneously indicates the accumulated sum of the work performed by that oarsman up to that instant. The apparatus is an integrating dynamometer which provides a continuous read-out of propulsive force, $F_x$, and effective work, $W_e$.

In practice, the value of $W_e$ is presented in digital form and the value of $F_x$ is presented by illuminating a series of electric lamps, with each lamp corresponding to a predetermined force level.

Referring now more particularly to FIGS. 5–9, an oar is held in the oarlock 22 and is adapted to pivot about the pin 20 during the stroke. Pin 20 is supported in a yoke 24 which is constrained to move in the x-direction by a surrounding frame 26 which includes sidewalls 28, bottom wall 30, front wall 32 and rear wall 34. A shaft 36 extends from yoke 24 through holes formed in front wall 32 and rear wall 34. Front shoulder 38 of yoke 24 is moved forwardly during the rowing stroke against the force of a spring 40 which is positioned around shaft 36 and extends between walls 32 and 34. The rear surface of wall 34 provides a stop which limits the movement of shoulder 38 of yoke 24 in the forward x-direction.

In order to minimize the effect of friction on the sliding of yoke 24, special bearing surfaces are provided. These bearing surfaces may be made of a plastic such as Teflon or nylon, and include bearing button 42 mounted in rear wall 34, bearing button 44 mounted in bottom wall 30 and bearing members 46 mounted in sidewalls 28.

The displacement of the sliding yoke 24 in the forward x-direction causes the spring 40 to be compressed. Assuming a constant spring coefficient, $k$, the displacement is directly proportional to $F_x/k$. Accordingly, the magnitude of moveemnt of the yoke 24 and shaft 36 against the strength of the spring is proportional to the propulsive force exerted by the oarsman.

To indicate the magnitude of this force, a series of switches 48 are mounted in a housing 50 and are connected to an electrical display panel 52 which includes a row of four lamps for each of the eight oarsman in an eight oar crew.

The first lamp in the series of four may be advantageously set to be illuminated when the oarsman exerts a force of 175 pounds, with the second lamp being turned on when the force is 200 pounds, the third lamp being turned on when the force is 225 pounds, and all four lamps being illuminated when the force exerted reaches 250 pounds. Display panel 52 may be equipped with additional lamps, if desired, and may include a selective switch circuit for changing the range of force indication.

The apparatus for selectively turning on the switches 48 in response to the magnitude of force exerted includes a block 54 mounted on the end of shaft 36 which contains a number, four in the example illustrated in the drawings, of spring loaded actuating plunger 56 that are set to predetermined levels by adjusting nuts 58. When block 54 is moved rearwardly by shaft 36, it comes in contact with each nut 58 in succession and moves that nut and plunger forwardly so that it breaks contact with switch 48. The switches are of a sensitive snap-action type, such as a microswitch, and the forward movement of plunger 56 causes the switch 48 to activate the circuit which illuminates an associated lamp in panel 52. The switching action takes place within a few thousanths of an inch movement, small when compared with the total displacement of the yoke 24 which is on the order of ⅜ of an inch.

*The integrator*

The integrator utilizes a wheel 60 and a cylinder 62. The angle assumed by the plane of wheel 60 is a function of the propulsive force exerted by the oarsman. Wheel 60 is positioned by the movement of yoke 24 in the x-direction.

Cylinder 62 slides along its axis in response to the rotational movement of oarlock 22 about pivot pin 20 and is a function of the distance through which the force of the stroke is exerted. When wheel 60 is positioned at an angle to the axis of cylinder 62, it rotates cylinder 62 when the cylinder is being slid along its axis, and the angle which the cylinder rotates is a measure of the work done by the oarsman. The rotation of cylinder 62 is transmitted by a follower 64, see FIGS. 7–9, to a switch 66, which may be a microswitch, that forms a part of adding apparatus.

Wheel 60 is free to rotate about its axis 68 and is mounted in a yoke 70 which is free to rotate about its axis 72. Wheel 60 bears against the surface of cylinder 62 due to the action of a spring 74. Cylinder 62, when displaced along shaft 76 by arm 78 of traveling plate 80, rotates during translation if the plane of wheel 60 makes an angle $\theta$ with the shaft 76 of cylinder 62, see FIG. 1.

A displacement $dz$ causes the cylinder 62 to turn through an angle $d\alpha$ given by $dz/R \tan \theta$ see Equation 1 of FIG. 3.

Figure 8:
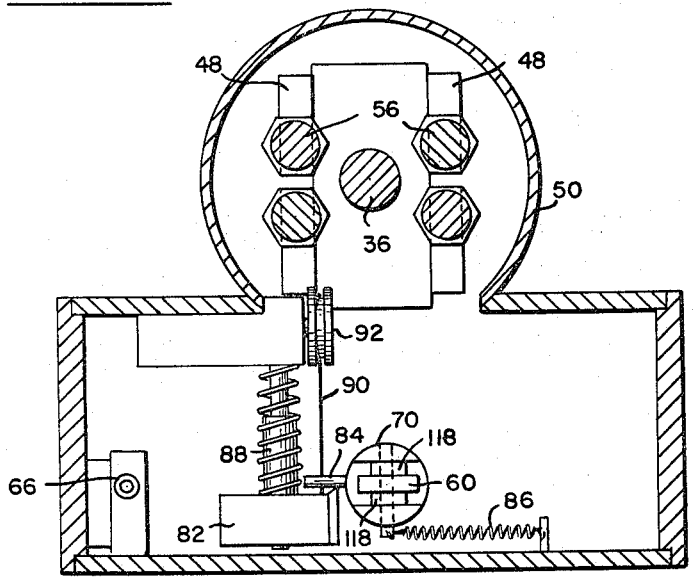
FIG. 8 is a view in section taken as indicated by the lines and arrows 8—8 which appear in FIG. 5.

The angular displacement $\theta$ of wheel 60 is caused by the motion of a bar 82, FIG. 8, which acts on a pin 84 that projects from yoke 70. A yoke return spring 86 is provided to return yoke 70 to its zero position at the end of the oarsman's stroke.

The bar 82 always remains at a fixed distance D from the axis shaft 72 of wheel yoke 70 and moves in a direction which is normal to the cylinder shaft 76. Since $Y = D \tan \theta$, as shown in Equation 2 of FIG. 3, we can arrive at Equation 3 of FIG. 3.

From a practical point of view the significant aspect of this relationship of Equation 3 is the linear dependence of $\lambda$ on Y. The total angular displacement, $\lambda$, is given by the summation of Equation 4 of FIG. 3.

Bar 82 is mounted on a spring-loaded plunger 88 attached to housing 50 and is moved by a cable 90, FIG. 8, which is trained around a pulley 92 and fastened to a bracket 94 mounted on block 54. Accordingly, bar 82 is moved in response to the movement of block 54 and yoke 24 to provide the propulsive force input to the integrator.

Figure 7:
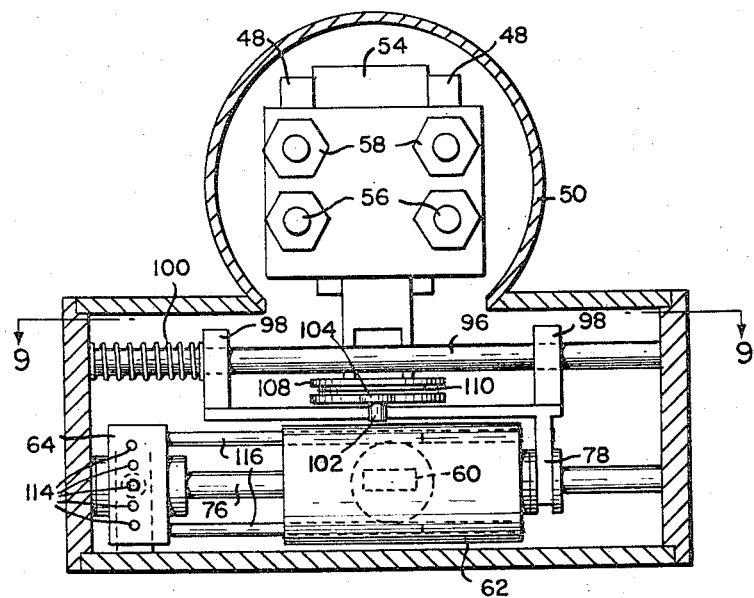
FIG. 7 is a view in section taken as indicated by the lines and arrows 7—7 which appear in FIG. 5.

Cylinder 62 is moved along shaft 76 by arm 78, FIG. 7, of traveling plate 80. Plate 80 is slidably mounted on a rod 96 by a pair of bushings 98. Traveling plate 80 is moved against the force of a return spring 100 by a pin 102 on the end of a lever 104. Pin 102 rides in a slot 106 in plate 80, and translates the rotational movement of a pulley 108 to linear movement of plate 80. Pully 108 is mounted on block 54 and is movable therewith.

Pulley 108 is rotated in accordance with the rotation of oarlock 22 by a cable 110 which is connected to a pulley 112 mounted on oarlock 22 and rotatable therewith. Since pulleys 108 and 110 are mounted on block 54 and oarlock 22, they move together in the propulsive direction $x$ so that cable 110 remains taut. No rotational movement between pulleys 108 and 112 is lost because of linear movement of those pulleys. Accordingly, lever 104 swings through the same angle $\phi$ as does the oarlock 22.

From the geometry of this arrangement:

$$dz = S \cos \phi \, d\phi$$

hence $$\alpha = \frac{S}{DR} \int_{\phi_o}^{\phi_t} Y \cos \phi \, d\phi$$

Substituting $F \cos \phi / k$ for Y gives $$\alpha = \frac{S}{KDR} \int_{\phi_o}^{\phi_t} F \cos^2 \phi \, d\phi$$

which is the desired form of the integrand. It follows that $$\alpha = \frac{2}{KDR}$$

or $w_e = C$ where C is a constant for the apparatus.

*Operation*

In operation, the propulsive force applied to yoke 24 moves block 54 to activate switches 48 and illuminate display panel 52 in accordance with the magnitude of the force.

The magnitude of the force is also conveyed from block 54 through cable 90 and bar 82 to position the plane of wheel 60 against the surface of cylinder 62.

The rotating motion of oarlock 22 is conveyed by pulley 112, cable 110, pulley 108, lever 104, pin 102, slot 106, traveling plate 80, and arm 78 to move cylinder 62 along its shaft 76 against the action of spring 100.

The rotation of cylinder 62 caused by the position of wheel 60 is a measure of the work done, and the cylinder rotation is transmitted by follower 64 to a switch 66. Follower 64 is provided with ten protuberances 114 which actuate switch 66 as the follower is rotated. Follower 64 is connected to cylinder 62 by a pair of slide rods 116.

Although the integrator will, in principle, add both positive and negative values, corresponding to plus and minus $\phi$, the mechanical construction of the dynamometer as shown in the drawings furnishes only positive values to the integrator. This reflects the fact that negative values of $F_x$ are rarely generated in competitive rowing.

Wheel 60, cylinder 62, and follower 64 must rotate on their axis with the least possible friction. Accordingly, bearing surfaces made of plastic, such as nylon or Teflon, are supplied. For example, wheel 60 is supported on Teflon washers 118.

On the other hand, the coefficient of friction between the contacting surfaces of wheel 60 and cylinder 62 should be as high as possible to avoid any relative slipping between the two elements.

The output of the integrator may be read from a standard electro-mechanical digital counter actuated by the switch 66. The equally spaced protuberances 114 on follower 64 cause switch 66 to close a predetermined number of times per revolution.

The invention has many advantages as applied to the sport of rowing. It provides an incentive to the oarsman since it shows the level at which he is pulling the shell. It makes the selecton of a crew much easier, since it eliminates much of the guesswork in picking the stronger oarsmen.

The integrator is particularly adapted to repetitive motions, such as the repetitive stroke in rowing. While the integrator has been described with reference to rowing, it will, of course, be realized that the integrator may be used for other purposes to integrate other inputs.

In practice, the invention improved the performance of one crew by about a quarter of a mile in the course of a three-mile race.

As will be evident from the foregoing, various changes may be made in details of the invention without departing from the scope thereof as defined in the following claims.

As is shown in FIG. 5, each oarsman is provided with an individual display panel 52a which enables him to access his own performance and gives him an incentive to improve, which has proved very valuable, according to oarsmen using the device and their coaches. This improved performance has been measured in terms of shortened times over a measured coarse.

What is claimed is:

1. An integrator comprising a wheel, means for positioning the plane of the wheel at an angle in response to one input, a rotatable cylinder in contact with the wheel, and means for displacing the cylinder axially in response to another input, said wheel rotating the cylinder an angle which is a measure of the integral of the inputs.

2. The integrator according to claim 1 in which means is provided for adding the sum of said angle and other angles formed in the same manner.

3. The integrator according to claim 1 in which the means for positioning the plane of the wheel is a dynamometer having a shaft adapted to slide axially, a frame positioned around the shaft to guide its movements in sliding back and forth, means limiting the axial movement of the shaft, and means operatively connected to the shaft and opposing its axial movement in one direction.

4. The integrator according to claim 1 in which the means for positioning the plane of the wheel is a dynamometer for measuring the propulsive force exerted by an oarsman and includes an oarlock rotatably mounted in a yoke having a shaft extending therefrom adapted to slide axially, a frame positioned around the shaft to guide its movements in sliding back and forth, means limiting the axial movement of the shaft, means operatively connected to the shaft and opposing its axial movement in one direction, and measuring means positioned so as to be energized when the shaft moves predetermined distances against the force of said opposing means.

5. The integrator according to claim 4 in which the measuring means comprises a series of lamps which are actuated in response to the magnitude of the propulsive force exerted by the oarsman so as to give a visual indication thereof to a coxswain.

6. The integrator according to claim 1 in which the cylinder displacing means includes a plate adapted to slide, means connecting the plate to the cylinder so that they slide together, said plate having a slot formed therein, a lever having a pin in said slot which drives the plate, and means for rotating the lever in response to the distance said force is exerted.

7. The integrator according to claim 1 in which the cylinder displacing means includes an oarlock which is rotatably mounted and rotates with each stroke of an oar, a first pulley mounted on and rotatable with the oarlock, a second pulley mounted a fixed distance away from the first pulley, a cable connecting the two pulleys so that they rotate together, a lever extending from the second pulley and rotatable therewith, a plate adapted to slide and having a slot formed therein which receives the lever so that the plate moves in a straight path in response to the rotation of the lever, and an arm connecting the plate to the cylinder so that the cylinder moves with the plate.

8. A dynamometer for measuring the propulsive force exerted by an oarsman comprising an oarlock rotatably mounted in a yoke having a shaft extending therefrom adapted to slide axially, a frame positioned around the shaft to guide its movements in sliding back and forth, means limiting the axial movement of the shaft, means operatively connected to the shaft and opposing its axial movement in one direction, and measuring means positioned so as to be energized when the shaft moves predetermined distances against the force of said opposing means.

9. The dynamometer according to claim 8 in which the opposing means is a spring.

10. The dynamometer according to claim 8 in which the measuring means includes a series of lamps which are actuated in response to the magnitude of the propulsive force exerted by the oarsman so as to give a visual indication thereof.

References Cited

UNITED STATES PATENTS

| 2,412,386 | 12/1946 | Borell | 346—31 |
| 2,562,186 | 7/1951 | Hallman | 235—61 |
| 2,679,754 | 6/1954 | Flamm | 73—115 |
| 2,846,641 | 8/1958 | Basham | 346—31 |
| 3,209,364 | 8/1965 | Hildebrandt | 346—31 |
| 2,199,955 | 5/1940 | Kruck | 73—141 |

FOREIGN PATENTS

| 500,543 | 6/1930 | Germany. |
| 691,747 | 5/1940 | Germany. |
| 1,173,693 | 7/1964 | West Germany. |

RICHARD C. QUEISSER, *Primary Examiner.*

J. H. WILLIAMSON, *Assistant Examiner.*

RICHARD B. WILKINSON, *Examiner.*